US006995778B2

(12) United States Patent
Noble et al.

(10) Patent No.: US 6,995,778 B2
(45) Date of Patent: Feb. 7, 2006

(54) SYMBOL EXPANSION CAPABILITY FOR MAP BASED DISPLAY

(75) Inventors: William B. Noble, Santa Monica, CA (US); Faisal Turki Al-Bakr, Riyadh (SA); Sheri L. Moore, Yorba Linda, CA (US)

(73) Assignee: Raytheon Company, Waltham, MA (US)

( * ) Notice: Subject to any disclaimer, the term of this patent is extended or adjusted under 35 U.S.C. 154(b) by 137 days.

(21) Appl. No.: 10/039,331

(22) Filed: Nov. 7, 2001

(65) Prior Publication Data
US 2003/0085910 A1 May 8, 2003

(51) Int. Cl.
*G09G 5/00* (2006.01)

(52) U.S. Cl. ............... 345/632; 345/643; 345/851; 345/855; 345/712

(58) Field of Classification Search ............... 345/632, 345/643, 851, 855, 712
See application file for complete search history.

(56) References Cited

U.S. PATENT DOCUMENTS

| 4,914,605 | A |   | 4/1990 | Loughmiller, Jr. et al. |
|---|---|---|---|---|
| 5,553,209 | A | * | 9/1996 | Johnson et al. ............. 395/133 |
| 5,790,121 | A |   | 8/1998 | Sklar et al. |
| 6,067,502 | A | * | 5/2000 | Hayashida et al. ......... 701/209 |

\* cited by examiner

*Primary Examiner*—Matthew C. Bella
*Assistant Examiner*—Tam Tran
(74) *Attorney, Agent, or Firm*—Daly, Crowley, Mofford & Durkee, LLP (57) ABSTRACT

A system for providing information on a computer map display indicates symbol and data components associated with one or more map display symbols. The system provides a symbol expansion display that can be applied to various map display symbols, including normal, cluttered, and de-cluttered.

33 Claims, 3 Drawing Sheets

SYMBOL EXPANSION CAPABILITY FOR MAP BASED DISPLAY

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to computer map display systems and more particularly to a system for providing information on a computer map display that is associated with map display symbols.

BACKGROUND OF THE INVENTION

As is known in the art, computers can display maps having map symbols thereon to describe the location of objects and personnel. Particularly for maps associated with military applications, map symbols can include objects such as aircraft, and groups of personnel such as battalions. As a computer map display is "zoomed out" by the operator, the map symbols are sometimes displayed so close together that a person viewing the map and the map symbols cannot effectively visualize the symbols, and cannot understand the meaning intended to be conveyed by the map symbols. In this case, the symbols are said to be "cluttered."

U.S. Pat. No. 5,553,209 to Johnson et al., entitled Method for Automatically Displaying Map Symbols, and assigned to the assignee of the present invention, discloses a method for de-cluttering displayed map symbols as the display is zoomed out. The Johnson method can de-clutter symbols that would otherwise be on top of one another. For example, where a map display indicates six individual identical aircraft in close proximity when zoomed in, when zoomed out, rather than indicating six aircraft symbols on top of each other, the Johnson method can resolve the overlap and display a single aircraft symbol. This example is indicated in FIGS. 5A–5D of the Johnson patent.

The Johnson method can also de-clutter symbols that are not identical. Particularly when applied to military map displays, symbols may be related to each other in a hierarchy. For example, a symbol that indicates the position of an infantry company is at a lower level of hierarchy than a symbol that indicates an infantry battalion, where the latter is known to consist of two infantry companies. The Johnson method can indicate the several infantry company symbols individually when the map display is zoomed in, and can resolve and replace these multiple symbols to a single infantry battalion symbol when the map display is zoomed out. Similarly, the Johnson method can indicate symbols at progressively higher levels of hierarchy as the display is further zoomed out. To continue the given example, two infantry battalion symbols in close proximity can be indicated as a single infantry brigade symbol when further zoomed out. The Johnson method provides a de-cluttered map display that automatically adjusts the level of de-cluttering for each amount of display zoom. The hierarchy of this example is given in FIGS. 2B and 6A–6B of the Johnson patent.

However, it should be recognized that the Johnson method cannot de-clutter symbols that are neither of the same type nor related in a hierarchy. The Johnson method will not, for example, de-clutter an aircraft symbol corresponding to an individual aircraft that is overlapping or in close proximity to a battalion symbol, corresponding to a number of personnel. Unrelated symbols remain cluttered and difficult to view even with the Johnson method.

Though the Johnson method provides a map display for which many symbols are more easily viewed by a person viewing a map, such as a map computer operator, some information that would otherwise be provided to the operator is lost as the symbols are de-cluttered. The information associated with the underlying levels of the hierarchy in a de-cluttered symbol are not visible to the operator. The information not visible can include data such as type of underlying assets (companies, battalions, aircraft, etc.), cost of underlying individual assets, number of underlying personnel, exact map position of underlying assets or personnel groups, etc.

For map displays in which the Johnson method is not used, it is well known that map display symbols can become cluttered as the display is zoomed out. Where the map display symbols are on top of each other, the operator may not be able to visualize the map display symbols, nor any information normally displayed in association with the cluttered symbols. Furthermore, for those unrelated symbols that the Johnson method cannot de-clutter, the Johnson method provides no improvement to operator visualization.

It would, therefore, be desirable to provide a system which allows a map operator to see information otherwise hidden by a method such as the Johnson method. It would further be desirable to provide a system which can display data associated with cluttered symbols that have not been de-cluttered by a method such as the Johnson method. It would still further be desirable to provide a system for displaying data that represents single entities and that are visually distinguishable.

SUMMARY OF THE INVENTION

In accordance with the present invention, a symbol expansion method includes selecting a map portion containing one or more map display symbols on a computer map display, and presenting a symbol expansion display related to the map display region on the computer map display. With this particular arrangement, a technique for clearly displaying information on a map is provided. The symbol expansion display technique presents information relevant to each of the one or more map display symbols to a user in a manner which can easily be read. By selecting a map portion which contains one or more map symbols, a user can determine which specific map display symbols require expansion. Thus, the user can choose to display information for cluttered map symbols, de-cluttered map symbols or single entity map symbols, in the selected map portion rather than across the entire map display.

In accordance with a still further aspect of the present invention, a symbol expansion apparatus includes a selector to select a map portion containing one or more map display symbols on a computer map display and a presentation processor for presenting a symbol expansion display related to the map display region on the computer map display. With this particular arrangement, the symbol expansion display can provide enhanced information on the computer map display to provide a viewer of the map with both more information as well as information that is more easily understood.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the symbol expansion capability, some introductory concepts and terminology are explained. Symbols or icons generated using the technique described in the aforementioned U.S. Pat. No. 5,553,209 to Johnson et al. will be called de-cluttered map display symbols. De-cluttered map display symbols include those that contain both single and multiple levels of hierarchy. Those cluttered map display symbols or icons that are replaced by a de-cluttered map display symbol are herein called underlying symbols.

Symbols or icons that are not de-cluttered, e.g. those that identify a single entity without an underlying hierarchy, are herein called normal map display symbols. If normal map display symbols are in close proximity, touching, or overlapping, they are herein called cluttered map display symbols. Normal, cluttered, and de-cluttered map display symbols are collectively called map display symbols.

Figure 1A:
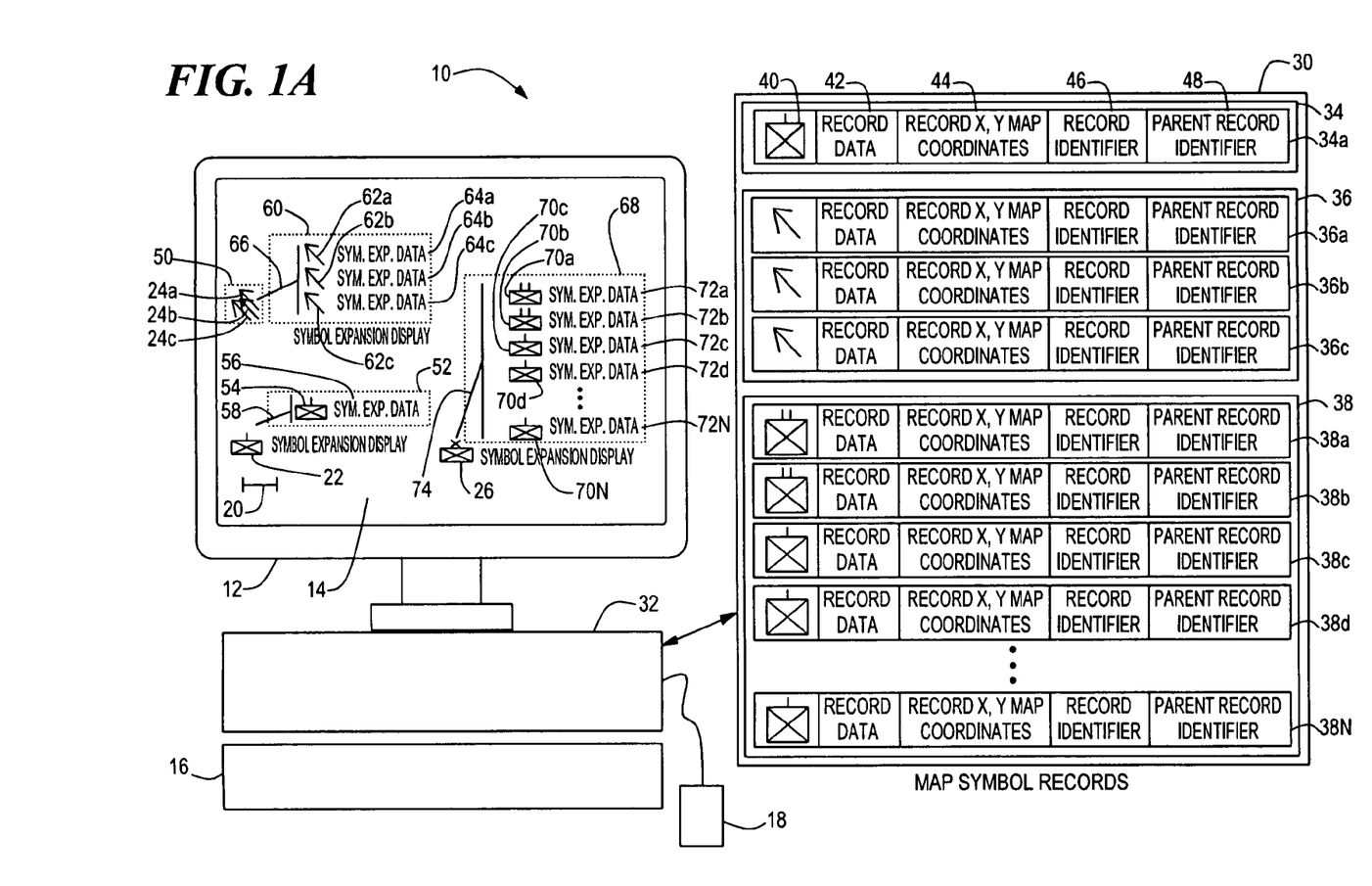
FIG. 1A is a block diagram of a map display system in accordance with the present invention.
Figure 1B:
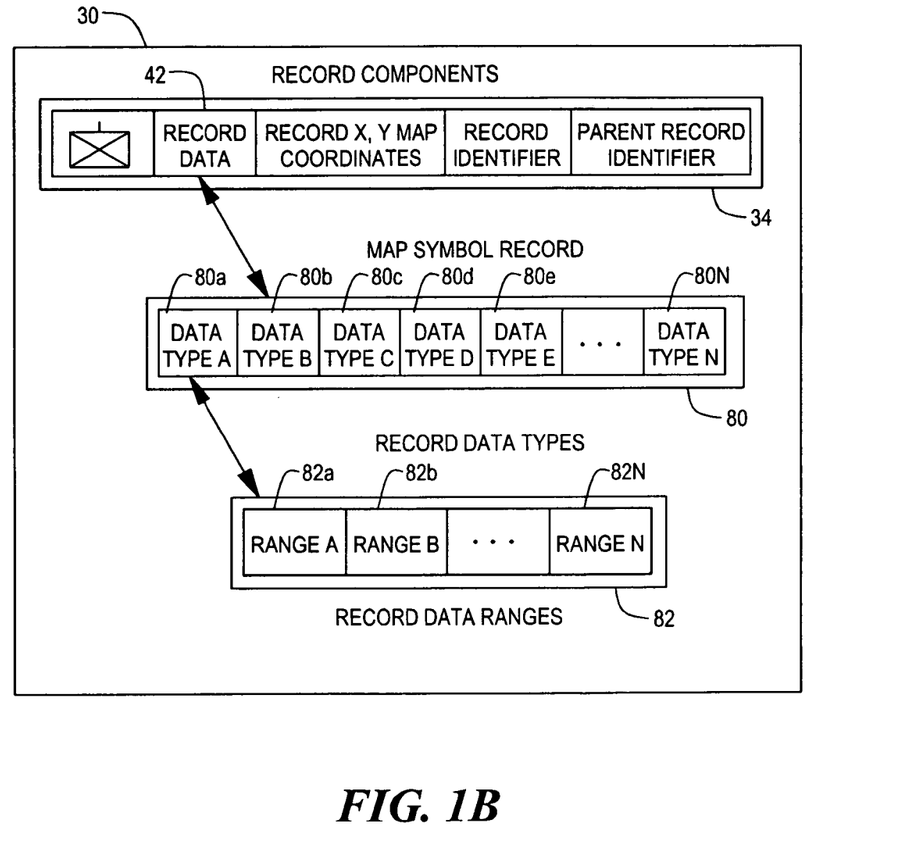
FIG. 1B is a block diagram of an expansion of record data associated with a map display symbol.

Referring now to FIGS. 1A and 1B in which like elements are shown having like reference designations, a map display system 10 includes a display apparatus 12 having displayed thereon a map 14. A map display operator can view the map 14 on the display 12. Using a keyboard 16 and a pointing device, such as a mouse 18, the operator can zoom the map display 14 to different scales using known techniques.

A map scale is represented by a conventional scale symbol 20. The map display 14, can contain normal map display symbols 22. The map display 14 can also contain map display symbols 24a–24c that are crowded together and thus referred to as cluttered symbols. In this particular example, cluttered symbols 24a–24c represent aircraft.

As the operator zooms out the display, otherwise cluttered symbols can be replaced with a de-cluttered symbol. For example, the three cluttered aircraft symbols 24a–24c can be replaced with a single de-cluttered aircraft symbol that indicates underlying aircraft symbols at one level of hierarchy. For another example, symbol 26 represents a de-cluttered hierarchical symbol, here representing an infantry brigade symbol, where an infantry brigade symbol is known to consist of six underlying infantry company symbols, or two underlying infantry battalion symbols.

A storage device 30 in communication with a processor 32 has stored therein map symbol records 34, 36, 38. Each of the map symbol records 34, 36, 38 are associated with a corresponding one of map display symbols 22, 24, 26. A single map symbol record 34a is associated with the normal map symbol 22. Cluttered map display symbols 24a–24c are associated with a corresponding number of individual map symbol records 36a–36c. Each of the map symbol records 36a–36c corresponds to one of the cluttered symbols 24a–24c. De-cluttered map display symbol 26 is associated with a group of map symbol records 38a–38N with various levels of hierarchy. Each of the map symbol records 38a–38N is associated with one of the underlying symbols of the de-cluttered symbol 26.

Taking map symbol record 34 as representative of all map symbol records, the map symbol record 34 is shown to include record components 40–48. Record component 40 corresponds to a record graphic associated with the map display symbol 22. Record component 42 corresponds to record data or text associated with the map display symbol 22. Record component 44 corresponds to record x-y map coordinates associated with the map display symbol 22. Record component 46 corresponds to a unique record identifier 46 that identifies the map display symbol 22. Record component 48 corresponds to a parent record identifier that defines the structure of any hierarchy associated with the map display symbol 22. It should be recognized by one of ordinary skill in the art that the exemplary map symbol record can have various record components and the invention herein is not limited to any particular group of such components.

The record graphic 40 represents graphic information corresponding to the map display symbol 22 with which it is associated. It should be recognized by one of ordinary skill in the art that the record graphic 40, when displayed as a symbol expansion graphic 54 on the map display, can have a different appearance than that of the map display symbol 22, including, but not limited to, a different size, shape, and color.

It should be recognized from the discussion above that three names have been given to the graphic information represented by a map display symbol, each name being used in a different context. For example, the map display symbol 22, the record graphic 40, and the symbol expansion graphic 54 represent corresponding information but each in different context. The map display symbol 22 is the originally displayed symbol, the record graphic 40 is corresponding graphic data stored in computer memory device 30, and the symbol expansion graphic 54 is a displayed graphic as part of the symbol expansion display.

As mentioned above, the user can select with the pointing device 18, a normal symbol 22, a cluttered symbol 24, or a de-cluttered symbol 26. Selection of a normal symbol 22 causes the symbol expansion system to generates a corresponding symbol expansion display 52. Selection of a cluttered symbol 24a causes the symbol expansion system to generates a corresponding symbol expansion display 62a, 64a. Similarly, selection of a de-cluttered symbol 26 causes the symbol expansion system to generates a corresponding symbol expansion display 68.

Alternatively, instead of selecting a single symbol with the pointing device 18, the user can select a symbol, or more typically a group of symbols, within a map display region (e.g. region 50) drawn by the pointing device 18. Alternatively still, the map display region 50 can be determined automatically as a pre-selected radius or polygon around one or more map display symbols selected by the pointing device 18. As a further alternative, the map display region 50 can be determined automatically so as to include those symbols touching, overlapping, or otherwise cluttered with a symbol selected by the pointing device 18. The selected group of symbols can be composed of either normal map display symbols 22, cluttered map display symbols 24a–24c, or de-cluttered map display symbols 26, where a group selected by the map display region 50 is one or more such symbols. By specifying the desired symbol or group of symbols, the operator can group map symbol records, for example map symbol records 36a–36c, that will result in a symbol expansion display to be described below.

As mentioned above, when a symbol or a group of symbols is selected using the pointing device 18, or other means for selecting, the symbol expansion system generates a symbol expansion display. The symbol expansion display is a tabular list associated with the symbol, group of symbols, or underlying symbols. An exemplary symbol expansion display can include symbol expansion graphics, and/or symbol expansion data. The tabular list can include only one symbol expansion graphic and one symbol expansion data. For example, when the normal map display symbol 22 is selected with the pointing device 18, the symbol expansion system 10 can provide a symbol expansion display 52 that includes a symbol expansion graphic 54 that corresponds to the record graphic 40 that further corresponds to the normal map display symbol 22. The symbol expansion system 10 can also provide a symbol expansion display 52 that includes symbol expansion text or data 56 that corresponds to the record data 42 that further corresponds to data associated with map display symbol 22. For example, the symbol expansion data 56 can indicate the number of troops associated with the map display symbol 22. Additionally, a lead line 58 can be displayed to guide a person viewing the map to visually associate the symbol expansion display 52 with the map display symbol 22.

For another example, when the group of cluttered map display symbols 24 are selected by pointing device 18 with the map display region 50, the symbol expansion system 10 can provide a tabular symbol expansion display 60 that includes symbol expansion graphics 62, symbol expansion data 64, and a lead line 66. The symbol expansion graphics 62 and the symbol expansion data 64 correspond to record graphics and record data of map symbol record group 36.

For yet another example, when a de-cluttered map display symbol 26 is selected, the symbols expansion system 10 can provide a tabular symbol expansion display 68 consisting of symbol expansion graphics 70, symbol expansion data 72, and a lead line 74. Note in this example that the symbol expansion graphics 70a–70b indicate infantry battalions, while symbol expansion graphics 70c–70N indicate infantry companies, all of which correspond to underlying symbols of the de-cluttered map display symbol 26 of an infantry brigade.

It should be recognized from the discussion above that, similar to the graphic information mentioned above, three names have been given to the data associated with a map display symbol, each name being used in a different context. For example, the data that is associated with the map display symbol 22, the record data 42, and the symbol expansion data 56 represent corresponding information but each in different context.

The user can also select the type of information to display in the symbol expansion display 52, 60, 68. For example, the user can choose to display only symbol expansion graphics 54, 62, 70 with lead lines 58, 66, 74. Alternatively, the user can a specify to have a display of only symbol expansion data 56, 64, 72 with lead lines 58, 66, 74. Alternatively, the user can select to display both symbol expansion graphics and symbol expansion data. The selection of the type of information to display can be accomplished by a setup computer screen menu that would then apply to all selected map display symbols and map display regions. Alternatively, the selection of the type of information to display can be accomplished by a computer screen menu corresponding to each map display symbol, for example map display symbol 22, or to each map display region, for example map display region 50, whereby the screen menu appears either manually or automatically upon selection of each such map display symbol or map display region.

Referring now to FIG. 1B an expansion of the record data 42 is shown. The record data 42 can have various record data types 80a–80N, each of which can have various record data ranges 82a–82N.

Again taking map symbol record 34 as representative of all map symbol records, the record data 42 can include record data types that are associated with the object represented by the map display symbol 22 (FIG. 1A). For example, a first record data type 80a can describe the number of troops represented by the map display symbol 22. Other examples of record data types 80a–80N include nationality of troops, friendliness (friend or foe) status, monetary value of an asset, security classification of an asset, type of service of an asset, geographical coordinates, and age of the symbol record. It should be recognized by one of ordinary skill in the art that there can be various record data types 80a–80N associated with record data 42, and the record data types are not limited to those listed above.

Again taking map symbol record 34 as representative of all map symbol records, each record data type 80a–80N, for example the record data type 80a, can include record data ranges for example record data ranges 82a–82N associated with the record data type 80a. Where, for example, the record data type 80a represents the nationality of troops, the record data ranges 82a–82N can represent the various nationalities associated with record data type 80a. For another example, where the record data type 80a represents an echelon level, for example a battalion, the record data ranges 82a–82N can represent the number of troops of various types. For yet another example, where the record data type 80a represents an asset value of a group of aircraft, the data ranges 82a–82N can represent the asset value of each of the aircraft.

The symbol expansion data 56, 64, 72 (FIG. 1A) displayed in the symbol expansion display 52, 60, 68 can correspond to all of the record data types contained in the record data of the corresponding map symbol records 34, 36, 38. However, the operator can also select to filter the record data of the map symbol records 34, 36, 38 so as to display only certain types of symbol expansion data. Such filtering can correspond either to a filtering to include only certain record data types 80 or only certain record data ranges 82. To provide such filtering selection, the symbol expansion system 10 can provide a record data type graphical user interface to the operator. Based upon filtering selection criteria made by the map operator with the record data type graphical user interface, under software control, the map display system 10 can automatically select, by way of database sorting or other algorithms, only selected record data types that match the filtering selection criteria and thereby display only corresponding symbol expansion data. This filtering selection criteria can be either global, throughout the map display, or can be local to a particular symbol expansion display 52, 60, 68. For example, the map operator can choose to display only a nationality of troops record data type, excluding all other record data types from the symbol expansion displays 52, 60, 68.

Alternatively, the filtering can correspond to record data ranges. To provide such filtering selection, the symbol expansion system 10 can provide a record data range graphical user interface to the operator. Based upon filtering selection criteria made by the map operator with the data range graphical user interface, under software control, the map display system 10 can automatically select, by way of data base sorting or other algorithms, only selected record data ranges that match the filtering selection criteria and thereby display only corresponding symbol expansion data. This filtering selection criteria can be either global, throughout the map display, or can be local to a particular symbol expansion display. For example, the map operator can choose to display only a nationality of troops record data type that is within the record data range of United States troops and French troops, excluding all other record data ranges from the symbol expansion displays 52, 60, 68. Thus, only United States and French troops would be displayed in the symbol expansion displays.

It should be recognized by one of ordinary skill in the art, that with the above mentioned filter graphical user interfaces, the map operator can select to display in the symbol expansion display any single or any grouping of record data types and/or record data ranges. A grouping of record data types can include, for example, all record data types that pertain to personnel. A grouping of record data ranges would include, for example, all data that pertains to the United States and to France. It should be further recognized that the user can specify any record data type to be displayed on the symbol expansion display as symbol expansion data, including but not limited to a number of troops record data type, a nationality of troops record data type, a friend or foe status record data type, a monetary value of an asset record data type, a security classification of an asset record data type, a type of service of an asset record data type, a geographical coordinates record data type, and an age of the symbol record data type.

It should be further recognized by one of ordinary skill in the art that other filtering and other filtering graphical user interfaces can be provided to allow the map operator to select various algorithmic functions to be applied to provide algorithmic combinations of different map symbol record. For example aircraft map symbol record 36 and personnel map symbol record 38 can be algorithmically combined, e.g. the map operator can select to display only personnel record data types that have above a certain record data range of associated aircraft.

The user can also select the language of the symbol expansion data, 56, 64, 72 as well as the information contained in the various graphical user interfaces used for selections and display control. The system 10 allows for left to right or right to left text appropriate for the selected language.

Where the map display information must have one or more map symbol records omitted from the corresponding display, for example due to the lack of equivalent words in the chosen language, or where the symbol expansion display is too long for the computer display, special characters may be substituted so as to clearly indicate the omission of some data.

Figure 2:
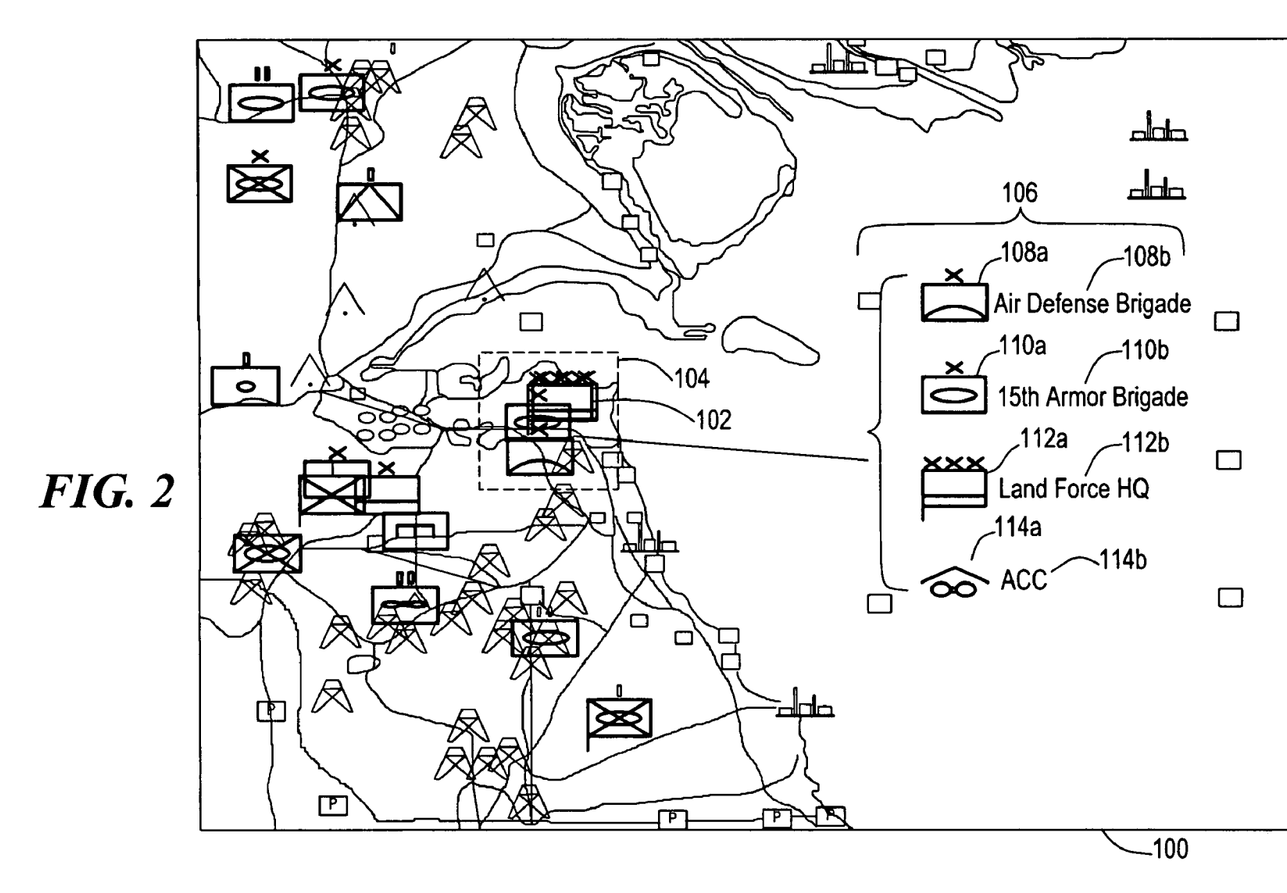
FIG. 2 is a view of a computer map display showing a symbol expansion display.

Referring now to FIG. 2, an exemplary computer map display 100 includes cluttered symbols 102 within a selected map display region 104 and a symbol expansion display 106 corresponding to the cluttered symbols 102. Although the cluttered symbols 102 are not individually distinguishable within the map display region 104, the symbol expansion display 106 provides a means by which a person viewing the computer map display 100 can resolve the information of the cluttered symbols 102. The symbol expansion display 106 includes a symbol expansion graphic 108a which corresponds to an icon which represents a brigade and symbol expansion data 108b which corresponds to the text "Air Defense Brigade." The symbol expansion graphic 110a corresponds to an icon which represents another brigade and symbol expansion data 110b corresponds to the text "15th Armor Brigade." Likewise, symbol 112a corresponds to an icon which represents a land target and symbol expansion data 112b corresponds to the text "Land Force." Likewise still, symbol expansion graphic 114a corresponds to an icon which represents an airbase and symbol 114b corresponds to the text "AOC," corresponding to an air operations center.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A symbol expansion method comprising:
   selecting, on a computer map display, a map portion containing one or more map display symbols, wherein the one or more map display symbols include map display symbols selected from among one or more de-cluttered map display symbols and two or more cluttered map display symbols; and
   presenting, on the computer map display, in response to the selecting, a symbol expansion display having information associated with the one or more map display symbols, wherein the symbol expansion display is displayed concurrently with the one or more map display symbols.

2. The method of claim 1, wherein the information presented in the symbol expansion display includes at least one of one or more symbol expansion graphics and one or more symbol expansion data, and wherein the selecting comprises:
   pointing to a map display symbol with a computer pointing device.

3. The method of claim 1, wherein the information presented in the symbol expansion display includes at least one of one or more symbol expansion graphics and one or more symbol expansion data, and wherein the selecting comprises:
   selecting a map portion of the computer map display containing the one or more map display symbols with the computer pointing device.

4. The method of claim 1, wherein the presenting comprises:
   relating the one or more map display symbols to one at more map symbol records retained in a computer memory, each containing record components;
   selecting one or more record components from among the one or more map symbol records;
   formatting the one or more selected record components; and
   presenting at least one of one or more symbol expansion graphics and one or more symbol expansion data associated with the selected record components in the symbol expansion display.

5. The method of claim 4, wherein the selecting one or more record components comprises:
   selecting one or more record graphics components of the one or more map symbol records.

6. The method of claim 4, wherein the selecting the one or more record components comprises:
   selecting record data of the one or more map symbol records.

7. The method of claim 6, wherein the selecting the record data comprises:
filtering the record data of the one or more map symbol records to provide the one or more symbol expansion data corresponding to a selected record data type.

8. The method of claim 7, wherein the filtering the record data comprises:
selecting a record data type selected from the group consisting of a dollar asset range record data type, a friendliness range record data type, a personnel size record data type, a security classification record data type, a type of service record data type, and an age of symbol record data type.

9. The method of claim 6, wherein the selecting the record data comprises:
filtering the record data of the one or more map symbol records to provide the one or more symbol expansion data corresponding to a selected record data range.

10. The method of claim 6, wherein the selecting the record data comprises:
algorithmically combining map symbol records to provide the one or more symbol expansion data.

11. The method of claim 1, wherein the presenting comprises:
presenting the symbol expansion display, movable by the user on the computer maps display.

12. The method of claim 1, wherein the information presented in the symbol expansion display includes at least one of one or more symbol expansion graphics and one or more symbol expansion data, and wherein the presenting comprises:
presenting the one or more symbol expansion data in a user selectable language.

13. The method of claim 1, wherein the presenting comprises:
presenting a lead line from the map portion to the symbol expansion display, wherein the lead line moves in accordance with the position of the symbol expansion display.

14. The method of claim 1, wherein the information presented in the symbol expansion display includes at least one of one or more symbol expansion graphics and one or more symbol expansion data, and wherein the presenting comprises:
color coding one or more of the one or more symbol expansion graphics to indicate an attribute of an object represented by one of the one or more map display symbols.

15. The method of claim 1, wherein the presenting comprises:
augmenting the symbol expansion display with special identifying characters that indicate when information has been omitted from the symbol expansion display.

16. A symbol expansion apparatus comprising:
a selection device to select, on a computer map display, a map portion containing one or more map display symbols, wherein the one or more map display symbols include map display symbols selected from among one or more de-cluttered map display symbols and two or more cluttered map display symbols; and
a presentation processor, which presents, on the computer map display, in response to selecting the map portion, a symbol expansion display having information associated with the one or more map display symbols, wherein the symbol expansion display is displayed concurrently with the one or more map display symbols.

17. The apparatus of claim 16, wherein the presentation processor comprises:
a computer memory having one or more map symbol records stored therein;
a relation processor which relates the one or more map display symbols to the one or more map symbol records;
a selection device for selecting one or more record components from among the one or more map symbol records; and
a display processor which receives and formats each of the one or more selected record components for presenting at least one of one or more symbol expansion graphics and one or more symbol expansion data in the symbol expansion display concurrently with the one or more map display symbols.

18. The apparatus of claim 16, wherein the presentation processor comprises:
means for providing the symbol expansion display, movable by the user on the computer map display.

19. The apparatus of claim 16, wherein the information presented in the symbol expansion display includes at least one of one or more symbol expansion graphics and one or more symbol expansion data, and wherein the selection device is adapted to select a map portion containing the one or more map display symbols.

20. The method of claim 1, wherein the computer map display is displayed at a first scale and the symbol expansion display is displayed concurrently with the computer map display at the first scale.

21. The method of claim 1, wherein the information presented in the symbol expansion display includes at least one of one or more symbol expansion graphics and one or more symbol expansion data, and wherein at least one of the one or more symbol expansion graphics is associated with a lower level of hierarchy of one of the one or more map display symbols.

22. The method of claim 1, wherein the information presented in the symbol expansion display includes at least one of one or more symbol expansion graphics and one or more symbol expansion data, and wherein at least one of the one or more symbol expansion data is associated with a lower level of hierarchy of one of the one or more map display symbols.

23. The apparatus of claim 16, wherein the computer map display is displayed at a first scale and the symbol expansion display is displayed concurrently with the computer map display at the first scale.

24. The apparatus of claim 16, wherein the information presented in the symbol expansion display includes at least one of one or more symbol expansion graphics and one or more symbol expansion data, and wherein at least one of the one or more symbol expansion graphics is associated with a lower level of hierarchy of one of the one or more map display symbols.

25. The apparatus of claim 16, wherein the information presented in the symbol expansion display includes at least one of one or more symbol expansion graphics and one or more symbol expansion data, and wherein at least one of the one or more symbol expansion data is associated with a lower level of hierarchy of one of the one or more map display symbols.

26. The method of claim 1, wherein the one or more map display symbols consist of one or more de-cluttered map display symbols.

27. The method of claim 1, wherein the one or more map display symbols consist of two or more cluttered map display symbols.

28. The apparatus of claim 16, wherein the one or more map display symbols consist of one or more de-cluttered map display symbols.

29. The apparatus of claim 16, wherein the one or more map display symbols consist of two or more cluttered map display symbols.

30. A symbol expansion method comprising:
selecting a map portion containing one or more map display symbols on a computer map display; and
presenting a symbol expansion display having information associated with the one or more map display symbols on the computer map display, wherein the symbol expansion display is displayed concurrently with the one or more map display symbols, wherein the presenting comprises:
  relating the one or more map display symbols to one or more map symbol records retained in a computer memory, each containing record components;
  selecting one or more record components from among the one or more map symbol records, wherein the selecting the one or more record components comprises selecting record data of the one or more map symbol records, wherein the selecting the record data comprises filtering the record data of the one or more map symbol records to provide the one or more symbol expansion data corresponding to a selected record data type, wherein the filtering the record data comprises selecting a record data type selected from a group consisting of a dollar asset range record data type, a friendliness range record data type, a personnel size record data type, a security classification record data type, a type of service record data type, and an age of symbol record data type;
  formatting the one or more selected record components; and
  presenting at least one of one or more symbol expansion graphics and one or more symbol expansion data associated with the selected record components in the symbol expansion display concurrently with the one or more map display symbols.

31. A symbol expansion method comprising:
selecting a map portion containing one or more map display symbols on a computer map display; and
presenting a symbol expansion display having information associated with the one or more map display symbols on the computer map display, wherein the symbol expansion display is displayed concurrently with the one or more map display symbols, wherein the presenting comprises:
  relating the one or more map display symbols to one or more map symbol records retained in a computer memory, each containing record components;
  selecting one or more record components from among the one or more map symbol records;
  formatting the one or more selected record components, wherein formatting comprises providing the one or more symbol expansion data, movable by the user on the computer maps display, and associated with the record data components of the one or more map symbol records, wherein the providing the one or more symbol expansion data comprises providing a user selectable language for the list of symbol expansion data; and
  presenting at least one of one or more symbol expansion graphics and one or more symbol expansion data associated with the selected record components in the symbol expansion display concurrently with the one or more map display symbols.

32. A symbol expansion method comprising:
selecting a map portion containing one or more map display symbols on a computer map display; and
presenting a symbol expansion display having information associated with the one or more map display symbols on the computer map display, wherein the symbol expansion display is displayed concurrently with the one or more map display symbols, wherein the presenting comprises:
  relating the one or more map display symbols to one or more map symbol records retained in a computer memory, each containing record components;
  selecting one or more record components from among the one or more map symbol records;
  formatting the one or more selected record components, wherein the formatting comprises color coding one or more of the one or more symbol expansion graphics to indicate an attribute of the object represented by one of the one or more map display symbols; and
  presenting at least one of one or more symbol expansion graphics and one or more symbol expansion data associated with the selected record components in the symbol expansion display concurrently with the one or more map display symbols.

33. A symbol expansion method comprising:
selecting a map portion containing one or more map display symbols on a computer map display; and
presenting a symbol expansion display having information associated with the one or more map display symbols on the computer map display, wherein the symbol expansion display is displayed concurrently with the one or more map display symbols, wherein the presenting comprises:
  relating the one or more map display symbols to one or more map symbol records retained in a computer memory, each containing record components;
  selecting one or more record components from among the one or more map symbol records;
  formatting the one or more selected record components, wherein the formatting comprises augmenting the symbol expansion display with special identifying characters that indicate when information has been omitted from the symbol expansion display; and
  presenting at least one of one or more symbol expansion graphics and one or more symbol expansion data associated with the selected record components in the symbol expansion display concurrently with the one or more map display symbols.

* * * * *

UNITED STATES PATENT AND TRADEMARK OFFICE
CERTIFICATE OF CORRECTION

PATENT NO.       : 6,995,778 B2                                                       Page 1 of 1
APPLICATION NO.  : 10/039331
DATED            : February 7, 2006
INVENTOR(S)      : William H. Noble et al.

It is certified that error appears in the above-identified patent and that said Letters Patent is hereby corrected as shown below:

Column 4, line 45 delete "to generates" and replace with --to generate--.

Column 4, lines 47-48 delete "to generates" and replace with --to generate--.

Column 4, line 50 delete "to generates" and replace with --to generate--.

Signed and Sealed this

Fifth Day of September, 2006

JON W. DUDAS
*Director of the United States Patent and Trademark Office*